(12) United States Patent
Sheridan

(10) Patent No.: US 10,119,465 B2
(45) Date of Patent: Nov. 6, 2018

(54) GEARED TURBOFAN WITH INDEPENDENT FLEXIBLE RING GEARS AND OIL COLLECTORS

(71) Applicant: United Technologies Corporation, Farmington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/182,909

(22) Filed: Jun. 15, 2016

(65) Prior Publication Data

US 2016/0376984 A1    Dec. 29, 2016

Related U.S. Application Data

(60) Provisional application No. 62/183,405, filed on Jun. 23, 2015.

(51) Int. Cl.
*F02C 3/107* (2006.01)
*F01D 25/18* (2006.01)
(Continued)

(52) U.S. Cl.
CPC ............ *F02C 3/107* (2013.01); *F01D 25/164* (2013.01); *F01D 25/18* (2013.01); *F02C 7/06* (2013.01);
(Continued)

(58) Field of Classification Search
CPC . F16H 1/48; F16H 1/2818; F16H 1/36; F16H 3/62; F16H 2001/2881; F02C 3/107; F02C 7/06; F02C 7/36; F05D 2260/40311
See application file for complete search history.

(56) References Cited

U.S. PATENT DOCUMENTS

| 3,459,072 A | * | 8/1969 | Shannon | ............... F16H 1/2818 |
| | | | | 123/142.5 R |
| 5,433,584 A | | 7/1995 | Amin et al. | |

(Continued)

FOREIGN PATENT DOCUMENTS

| EP | 1777380 | 10/2008 |
| EP | 2441923 A2 | 4/2012 |

(Continued)

OTHER PUBLICATIONS

European Search Report for EP Application No. 16176050.9 dated Nov. 30, 2016.

(Continued)

*Primary Examiner* — Andrew Nguyen
*Assistant Examiner* — James McGlynn
(74) *Attorney, Agent, or Firm* — Carlson, Gaskey & Olds, P.C.

(57) ABSTRACT

A geared turbofan engine includes a fan rotatable about an engine axis. A compressor section compresses air and delivers the compressed air to a combustor where the compressed air is mixed with fuel and ignited to drive a turbine section that in turn drives the fan and the compressor section. A gear system is driven by the turbine section for driving the fan at a speed different than the turbine section. The gear system includes a carrier attached to a fan shaft. A plurality of planet gears are supported within the carrier. Each of the plurality of planet gears includes a first row of gear teeth and a second row of gear teeth supported within the carrier. A sun gear is driven by a turbine section. The sun gear is in driving engagement with the plurality of planet gears. At least two separate ring gears circumscribe the plurality of planet gears. Each of the at least two ring gears are supported by a respective flexible ring gear mount that enables movement (Continued)

relative to an engine static structure. A fan drive gear system for a gas turbine engine is also disclosed.

14 Claims, 5 Drawing Sheets

(51) Int. Cl.

| | | |
|---|---|---|
| *F01D 25/16* | (2006.01) | |
| *F02C 7/06* | (2006.01) | |
| *F02C 7/36* | (2006.01) | |
| *F16H 1/28* | (2006.01) | |
| *F16H 1/48* | (2006.01) | |
| *F02K 3/06* | (2006.01) | |

(52) U.S. Cl.
CPC .............. *F02C 7/36* (2013.01); *F02K 3/06* (2013.01); *F16H 1/2818* (2013.01); *F16H 1/48* (2013.01); *F05D 2220/323* (2013.01); *F05D 2230/64* (2013.01); *F05D 2240/35* (2013.01); *F05D 2240/54* (2013.01); *F05D 2240/60* (2013.01); *F05D 2250/611* (2013.01); *F05D 2260/40311* (2013.01); *F05D 2260/602* (2013.01); *F05D 2260/609* (2013.01); *F05D 2260/98* (2013.01); *Y02T 50/671* (2013.01)

(56) References Cited

U.S. PATENT DOCUMENTS

| | | |
|---|---|---|
| 5,433,674 A | 7/1995 | Sheridan et al. |
| 5,472,383 A | 12/1995 | McKibbin |
| 6,073,439 A | 6/2000 | Beaven et al. |
| 6,117,036 A * | 9/2000 | Lanzon ................ B60K 17/344 475/204 |
| 6,223,616 B1 | 5/2001 | Sheridan et al. |
| 6,260,351 B1 | 7/2001 | Delano |
| 6,663,530 B2 | 12/2003 | Poulin et al. |
| 6,735,954 B2 | 5/2004 | MacFarlane et al. |
| 6,855,089 B2 | 2/2005 | Poulin et al. |
| 6,895,741 B2 | 5/2005 | Rago et al. |
| 7,104,918 B2 | 9/2006 | Mitrovic |
| 7,144,349 B2 | 12/2006 | Mitrovic |
| 7,223,197 B2 | 5/2007 | Poulin et al. |
| 7,591,754 B2 | 9/2009 | Duong et al. |
| 7,665,293 B2 | 2/2010 | Wilson et al. |
| 7,704,178 B2 | 4/2010 | Sheridan |
| 7,841,163 B2 | 11/2010 | Welch et al. |
| 7,841,165 B2 | 11/2010 | Orlando |
| 7,926,260 B2 | 4/2011 | Sheridan et al. |
| 7,959,532 B2 | 6/2011 | Suciu et al. |
| 8,172,717 B2 | 5/2012 | Lopez et al. |
| 8,276,275 B2 | 10/2012 | Sheridan et al. |
| 8,297,916 B1 | 10/2012 | McCune |
| 8,297,917 B1 | 10/2012 | McCune |
| 8,572,943 B1 | 11/2013 | Sheridan |
| 8,756,908 B2 | 6/2014 | Sheridan et al. |
| 8,813,469 B2 | 8/2014 | Sheridan |
| 8,814,503 B2 | 8/2014 | McCune et al. |
| 8,900,083 B2 | 12/2014 | Sheridan |
| 8,931,285 B2 | 1/2015 | McCune et al. |
| 8,935,853 B2 | 1/2015 | Sheridan et al. |
| 9,133,729 B1 | 9/2015 | McCune et al. |
| 9,239,012 B2 | 1/2016 | McCune et al. |
| 9,631,558 B2 | 4/2017 | McCune et al. |
| 9,739,170 B2 * | 8/2017 | Ertas ...................... F16H 57/025 |
| 2008/0097813 A1 | 4/2008 | Orlando et al. |
| 2010/0013234 A1 | 1/2010 | Sloth |
| 2010/0105516 A1 | 4/2010 | Sheridan et al. |
| 2010/0150702 A1 | 6/2010 | Sheridan |
| 2011/0106510 A1 | 5/2011 | Poon |
| 2012/0088624 A1* | 4/2012 | Sheridan ................ F01D 25/16 475/159 |
| 2013/0192196 A1 | 8/2013 | Suciu et al. |
| 2013/0287575 A1 | 10/2013 | McCune et al. |
| 2013/0331223 A1 | 12/2013 | McCune et al. |
| 2013/0336791 A1 | 12/2013 | McCune et al. |
| 2014/0155219 A1* | 6/2014 | McCune ................ F01D 15/12 475/331 |
| 2016/0076393 A1 | 3/2016 | Sheridan |
| 2016/0090988 A1 | 3/2016 | Venter |
| 2016/0097330 A1 | 4/2016 | Venter |
| 2016/0097331 A1 | 4/2016 | Venter et al. |
| 2016/0298639 A1 | 10/2016 | Brault et al. |
| 2017/0009776 A1 | 1/2017 | Gomanne et al. |

FOREIGN PATENT DOCUMENTS

| | | |
|---|---|---|
| EP | 2532841 | 12/2012 |
| EP | 3002433 A1 | 4/2016 |
| WO | 2014/158439 | 10/2014 |
| WO | 2014/182467 A1 | 11/2014 |

OTHER PUBLICATIONS

Hendricks, E.S. & Tong, Michael, T. (2012). Performance and weight estimates for an advanced open rotor engine. 48th Joint Propulsion Conference and Exhibit. Atlanta, GA, Jul. 30-Aug. 1, 2012.

Gunston, B. (2000). Jane's Aero-Engines. ISBN 0710614055.

Kandebo, S. (1998). Geared-turbofan engine design targets cost, complexity. Aviation Week & Space Technology; New York; Feb. 23, 1998.

Zalud, T. (1998). Gears put a new spin on turbofan performance. Machine Design, Nov. 5, 1998, 70(20) p. 104.

* cited by examiner

GEARED TURBOFAN WITH INDEPENDENT FLEXIBLE RING GEARS AND OIL COLLECTORS

CROSS REFERENCE TO RELATED APPLICATION

This application claims priority to U.S. Provisional Application No. 62/183,405 filed Jun. 23, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

A gas turbine engine experiences forces during operation that can cause misalignment of a gear system. Such misalignment can be accommodated by increasing the strength of the static structure. However, increasing the static structure adds weight that detracts from the efficiencies gained by the gear system.

Turbine engine manufacturers continue to seek further improvements to engine performance including improvements to thermal, transfer and propulsive efficiencies.

SUMMARY

In a featured embodiment, a geared turbofan engine includes a fan rotatable about an engine axis. A compressor section compresses air and delivers the compressed air to a combustor where the compressed air is mixed with fuel and ignited to drive a turbine section that in turn drives the fan and the compressor section. A gear system is driven by the turbine section for driving the fan at a speed different than the turbine section. The gear system includes a carrier attached to a fan shaft. A plurality of planet gears are supported within the carrier. Each of the plurality of planet gears includes a first row of gear teeth and a second row of gear teeth supported within the carrier. A sun gear is driven by a turbine section. The sun gear is in driving engagement with the plurality of planet gears. At least two separate ring gears circumscribe the plurality of planet gears. Each of the at least two ring gears are supported by a respective flexible ring gear mount that enables movement relative to an engine static structure.

In another embodiment according to the previous embodiment, the sun gear includes first and second sets of gear teeth that mesh with corresponding first and second rows of gear teeth of the plurality of planet gears.

In another embodiment according to any of the previous embodiments, includes a first bearing assembly forward of the gear system supporting a forward portion of the fan shaft and a second bearing assembly aft of the gear system.

In another embodiment according to any of the previous embodiments, the carrier and fan shaft include an integral structure.

In another embodiment according to any of the previous embodiments, the compressor section includes a low pressure compressor driven by the fan shaft at a speed common to the fan.

In another embodiment according to any of the previous embodiments, the flexible ring gear mounts collect oil expelled from the gear system and direct the collected oil through openings within each mount to an oil collector system.

In another embodiment according to any of the previous embodiments, the collector system surrounds the ring gears to catch any oil in close proximity of the ring gears and extends forward and aft of the gear system to capture oil from the carrier and planet gears.

In another embodiment according to any of the previous embodiments, oil is transported by one or more tubes to an oil collector system.

In another embodiment according to any of the previous embodiments, each of the flexible ring gear mounts has equal stiffness to accommodate carrier torsional wind up and reduce misalignment within the gear system.

In another embodiment according to any of the previous embodiments, the flexible ring gear mounts enable the ring gears to flex in the radial direction and angular direction with respect to an engine centerline and are at least 5 times stiffer in the torsional direction.

In another embodiment according to any of the previous embodiments, each of the plurality of planet gears is supported by one of a ball bearing, a roller bearing, a tapered roller bearing and a journal bearing.

In another featured embodiment, a fan drive gear system for a gas turbine engine includes a carrier supporting a plurality of planet gears. Each of the plurality of planet gears includes a first row of gear teeth and a second row of gear teeth supported within the carrier. A sun gear is driven by a turbine section. The sun gear is in driving engagement with the plurality of planet gears. At least two independent sets of ring gear teeth circumscribe the plurality of planet gears. Each of the at least two independent sets of ring gear teeth are engaged with a corresponding one of the first row of gear teeth and the second row of gear teeth. Each of the at least two independent sets of ring gear teeth are supported by a respective flexible ring gear mount that enables movement relative to an engine static structure.

In another embodiment according to the previous embodiment, the sun gear includes first and second sets of gear teeth that mesh with corresponding first and second rows of gear teeth of the plurality of planet gears.

In another embodiment according to any of the previous embodiments, includes a first bearing assembly forward of the gear system supporting a forward portion of a fan shaft and a second bearing assembly aft of the gear system.

In another embodiment according to any of the previous embodiments, the carrier and fan shaft include an integral structure.

In another embodiment according to any of the previous embodiments, each of the ring gear teeth sets is separately mounted to a respective flexible ring gear mount.

In another embodiment according to any of the previous embodiments, each of the flexible ring gear mounts collects oil expelled from the gear system and directs the collected oil through openings within each mount to an oil collector system.

In another embodiment according to any of the previous embodiments, the flexible ring gear mounts enable the ring gears to flex in the radial direction and angular direction with respect to an engine centerline and are at least 5 times stiffer in the torsional direction.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1A:
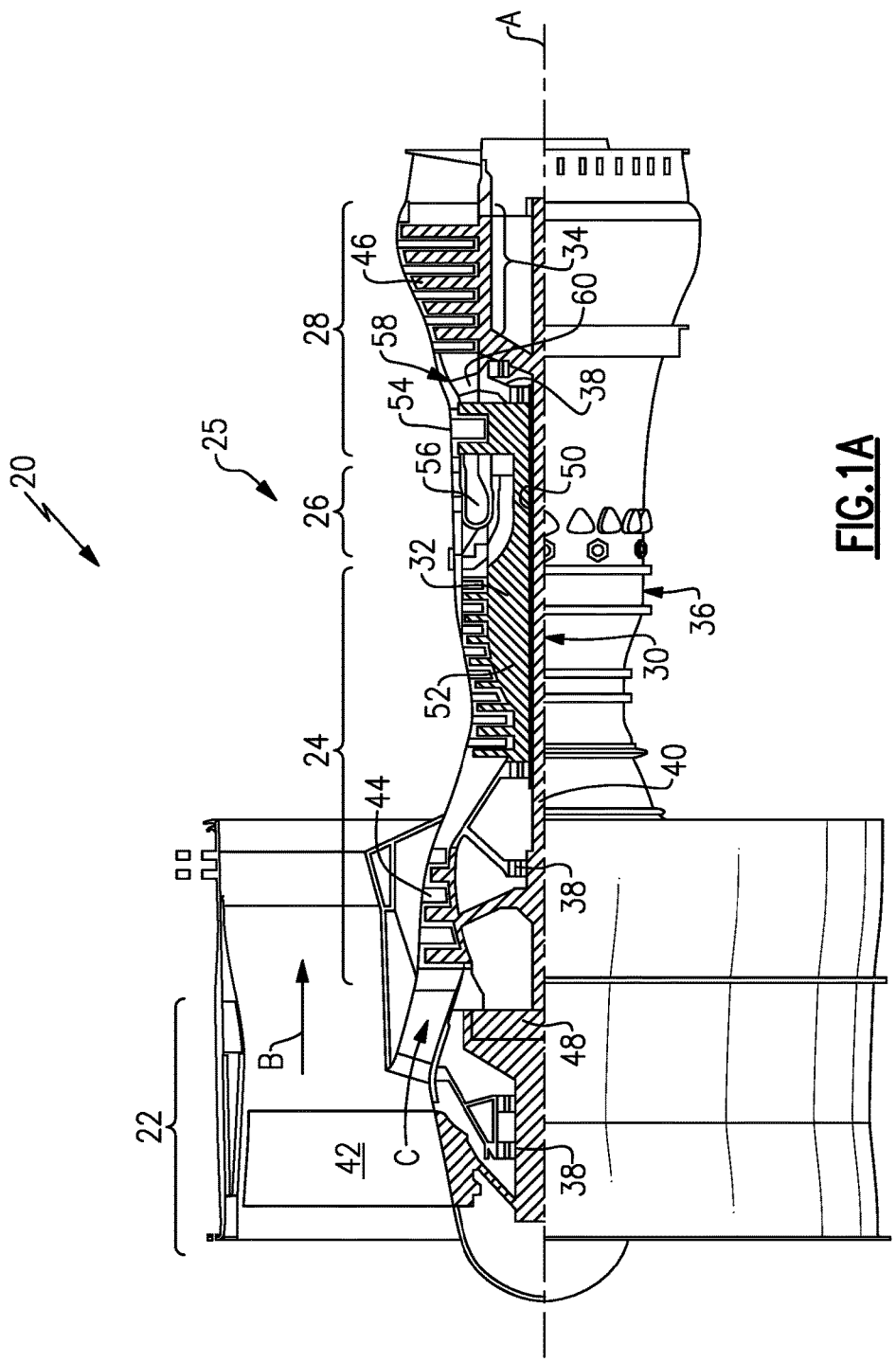
FIG. 1A schematically shows an embodiment of a gas turbine engine.

FIG. 1A schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high-energy exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 1B:
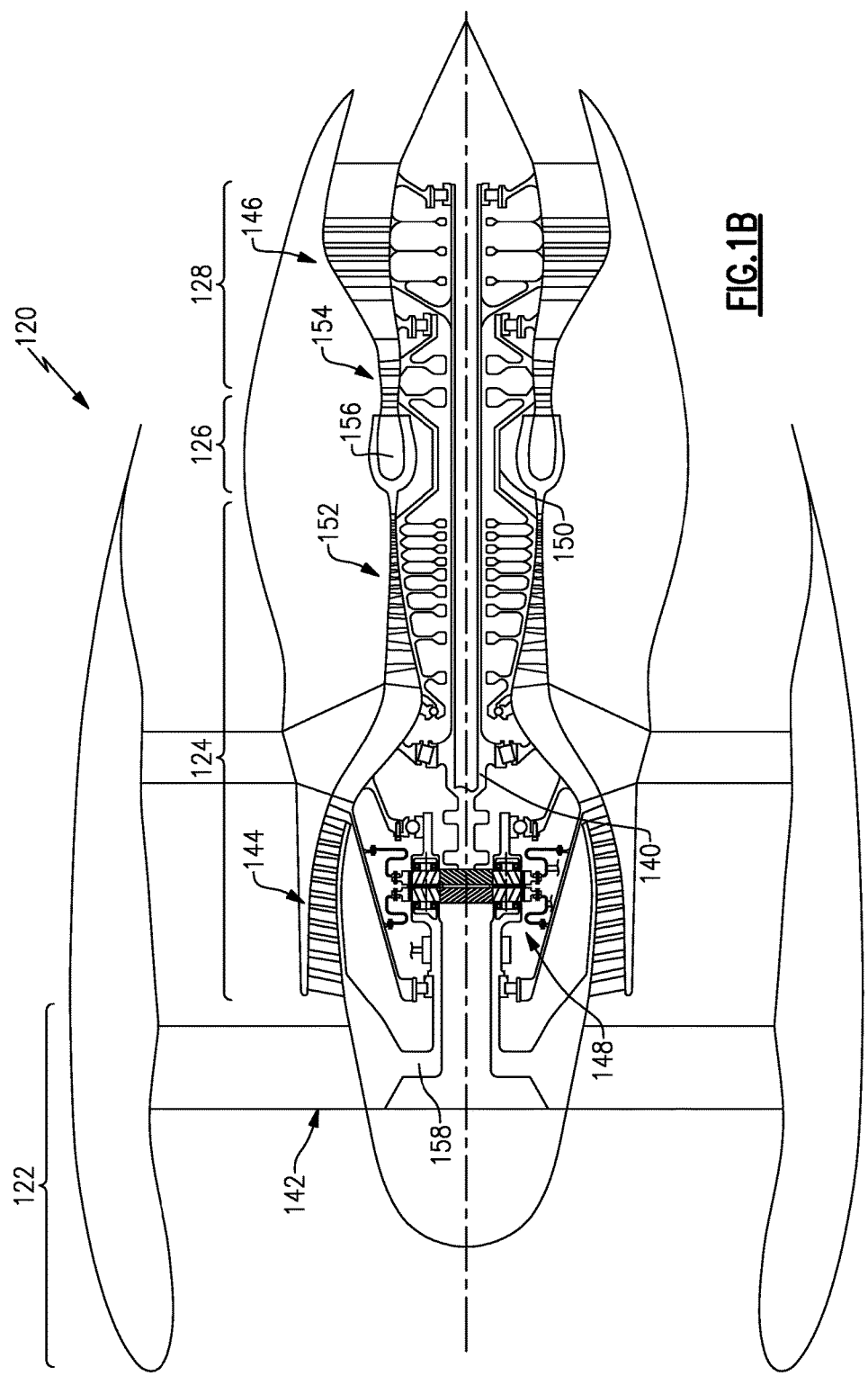
FIG. 1B schematically shows another embodiment of geared turbofan engine.

Referring to FIG. 1B, another example geared turbofan 120 includes a low pressure compressor (LPC) 144 tied to a fan shaft 158. The geared turbofan engine 120 includes a compressor section 124 that supplies compressed air to a combustor 156 of the combustor section 126. In the combustor section 126 the compressed air is mixed with fuel and ignited to generate high-energy gas flow that drives the turbine section 128. The example turbine section 128 includes a high pressure turbine 154 forward of a low pressure turbine 146. The high pressure turbine 154 drives a high pressure compressor (HPC) 152 through an outer shaft 150. The low pressure turbine 146 drives a gear system 148 through an inner shaft 140. It should be understood, that the example engine 120 is a two-spool engine, however it is within the contemplation of this disclosure that a three-spool engine would benefit from the disclosures herein. The example engine 120 includes the LPC 144 attached to the fan shaft 158 such that fan blades 142 and the LPC 144 rotate in a common direction and common speed.

Figure 2:
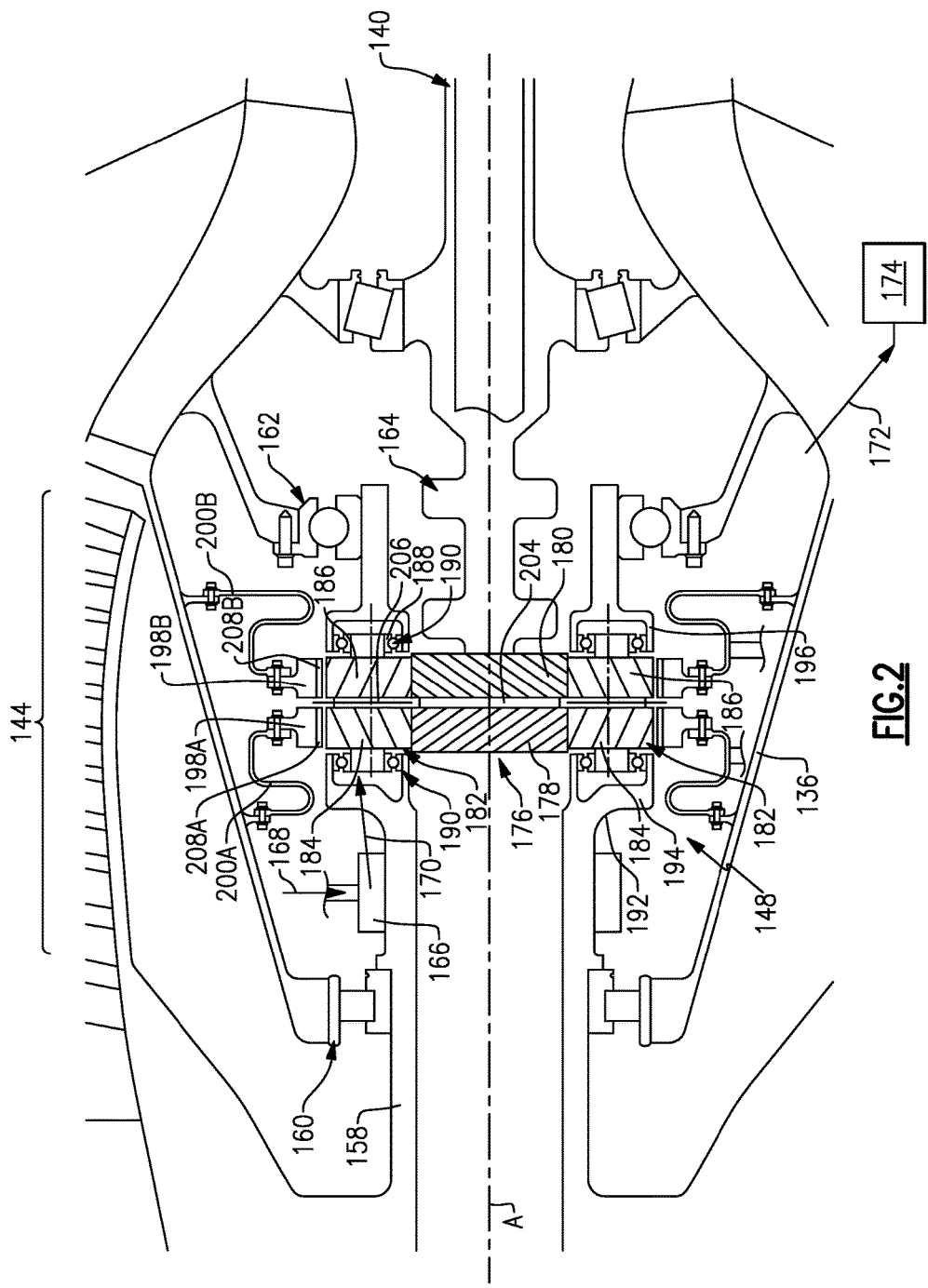
FIG. 2 schematically shows an example gear system.

Referring to FIG. 2 with continued reference to FIG. 1B, the gear system 148 is driven through a coupling shaft 164 by the low pressure turbine 146. The gear system 148 includes a sun gear 176 coupled to the coupling shaft 164 that drives a plurality of planet gears 182 supported within a carrier 192. The planet gears 182 are circumscribed by ring gears 198A and 198B. The example ring gears 198A and 198B are each supported individually by a flexible ring gear mount 200A-B. The ring gear mounts 200A-B enable each ring gear 198A-B to move relative to static engine structure 136.

The planet gears 182 each include a first row of gear teeth 184 and a second separate row of gear teeth 186. The first row of gear teeth 184 are oriented opposite the second row of gear teeth 186 to provide a self-centering and alignment function. The first row of gear teeth 184 and the second row of gear teeth 186 are integrally formed as part of a common boss 206. Each of the planet gears 182 are supported on a corresponding shaft 188. The shaft 188 is supported by the carrier 192. The carrier 192 includes a forward portion 194 and an aft portion 196 that support ends of the shaft 188 within bearing assemblies 190. The bearing assemblies 190 may be one of a ball bearing, a roller bearing and a tapered roller bearing. The bearing assemblies may also comprise a journal bearing.

The example carrier 192 is attached to the fan shaft 158 and rotates to drive the fan 122 and the LPC 144. In one example embodiment, the carrier 192 and the fan shaft 158 comprise an integral structure. The carrier 192 may also be a separate structure attached to the fan shaft 158 by fasteners or other known fastening assemblies.

The example gear system 148 is mounted between a first bearing assembly 160 supporting the fan shaft 158 forward of the gear system 148 and a second bearing assembly 162 supporting the fan shaft 158 aft of the gear system 148. In this example, the first bearing assembly 160 is a roller bearing and constrains the fan shaft 158 radially. The example second bearing assembly 162 is a ball bearing assembly and constrains the fan shaft 158 radially and axially. As should be readily appreciated, other bearing arrangements are within the contemplation of this disclosure.

The gear system 148 is a planetary style gear system because the ring gears 198A-B are fixed against rotation and the carrier 192 rotates the fan shaft 158. The sun gear 176 includes a first set of gear teeth 178 and a second set of gear teeth 180 on a common boss 204 that engage corresponding rows of gear teeth 184, 186 of the planet gears 182. The ring gears 198A-B include gear teeth 208A-B that also correspond to the gear teeth rows of the planet gears 182.

Oil is delivered to the gear system 148 through conduits schematically shown at 168 to an oil transfer bearing 166. Oil indicated at 170 is then output to the gear interfaces of the gear system 148. Oil exhausted, schematically shown at 172, from the gear system 148 is captured by an oil collector system schematically shown at 174. Oil that leaves the gear system 148 is returned to the lubrication system to be cleaned and cooled for re-use.

Figure 3:
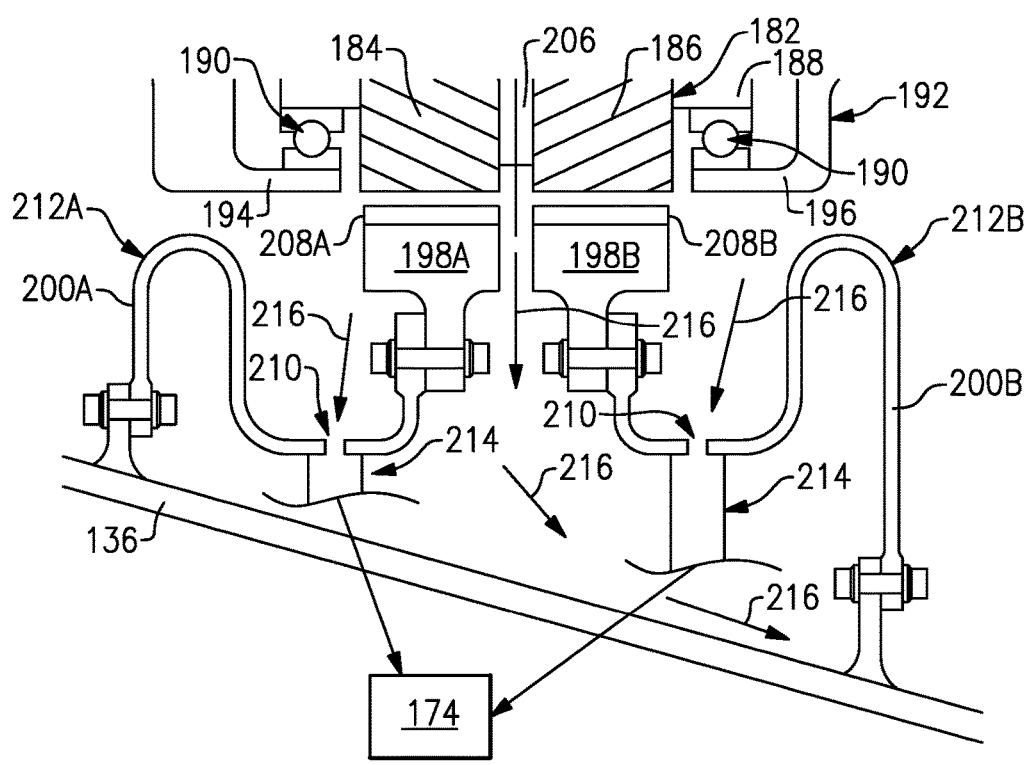
FIG. 3 is enlarged view of the example gear system.

Referring to FIG. 3 with continued reference to FIG. 2, the ring gear mounts 200A-B include a curved portion 212A-B that enables flexing and movement relative to the static structure 136 to accommodate misalignment and maintain a desired gear engagement with the planet gears 182. The example mounts 200A-B also include features that capture and direct oil to the collector system 174, including oil gathering and directing features in the mounts 200A-B that provide a light weight, low part count simple integrated system.

The undulating curved portions 212A-B are shaped to form a collector to catch oil, indicated by arrows 216, either forward or aft of the ring gears 198A-B. The undulating curved portions 212A-B are configured to enable the ring gears 198A-B to flex in radial and angular directions but restrain torsional movement of the ring gears 198A-B. In this disclosed example, each of the mounts 200A-B are five (5) to ten (10) times stiffer in a torsional direction than in radial or angular directions. In another embodiment the mounts 200A-B are greater than five (5) times stiffer in the torsional direction as compared to the radial or angular directions. The stiffness in the torsional direction prevents twist of the ring gears 198A-B during movement, while the reduced stiffness in the radial and angular directions accommodates bending stresses and strains to maintain alignment with the planet gears 182.

The example mounts 200A-B are generally attached to each ring gear 198A-B in the center to equalize torsional wind up, but variations can be utilized to enable the mount 200A-B to be attached at either end of the corresponding ring gear 198A-B. It does not need to be symmetrical. Each mount 200A-B can have exactly equal torsional stiffness to accommodate similar symmetrical loading exerted by the carrier 192. Each mount 200A-B may also include different torsional stiffness to accommodate unbalanced, non-symmetrical forces exerted by the carrier 192.

The oil collector system 174 includes gutters 214 that capture oil 216 communicated through openings 210 within the mounts 200A-B. Oil that is not collected is lost and cannot be reused. The loss of oil can reduce engine and gear efficiency. Accordingly, the example gear system 148 and oil collector system 174 are integrated to improve oil capture. The example gear system 148 and collector system 174 combine to capture at least 60% of the oil expelled from the rotating carrier 192.

Figure 4:
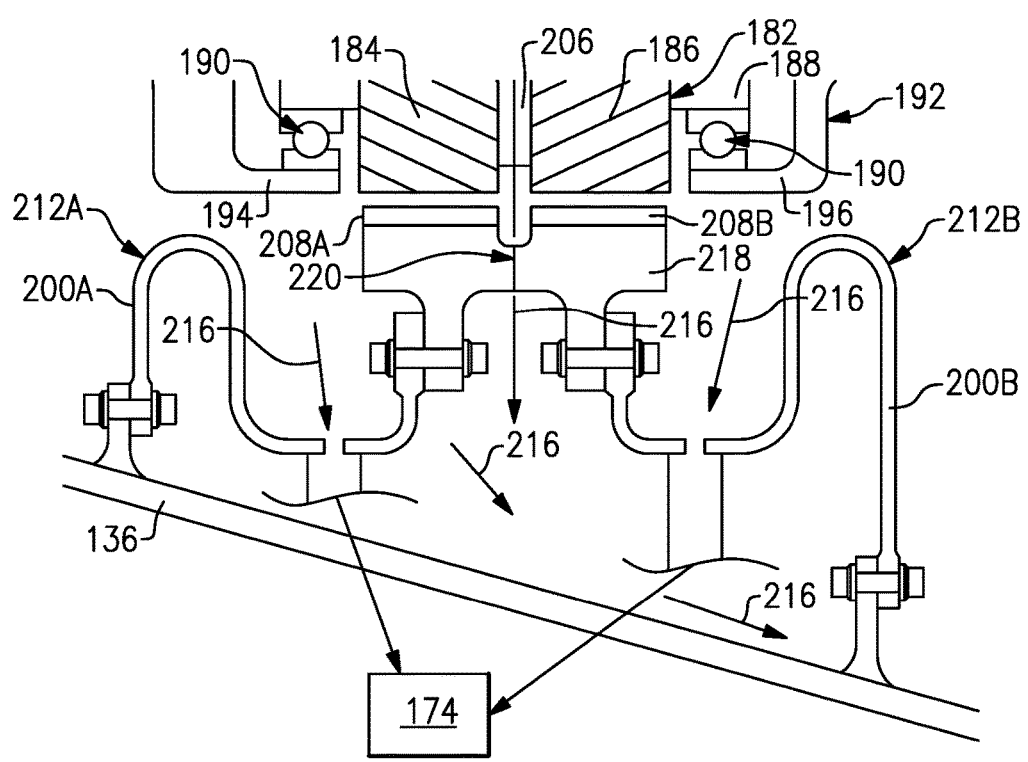
FIG. 4 is enlarged view of another example gear system.

Referring to FIG. 4, a one piece ring gear 218 is shown and is supported by the dual mounts 200A-B as in the embodiment disclosed in FIG. 3. The one piece ring gear 218 maintains the two sets of gear teeth 208A-B to accommodate the two rows of gear teeth 184, 186 defined on the planet gears 182. The one piece ring gear 218 includes a flex portion 220 that enables a limited amount of bending to accommodate non-symmetrical loading.

The gear structures comprising the example gear system 148 including the sun gear 176, the planet gears 182 and the ring gears 198A-B, and 218 may include gear teeth structures that accommodate thrust loads and other loading encountered during operation. In one disclosed embodiment the sun gear 176 and the planet gears 182 comprise bi-helical gears supported on a single shaft to internally react the axial load through a solid shaft such as the shaft 188 supporting each of the planet gears 182. Although a particular gear configuration is disclosed, other gear configurations remain within the contemplation of this disclosure.

The disclosed gear system provides a planetary style gear system that enables higher possible gear ratios that in turn enable more beneficial fan bypass ratios. The disclosed ring gear mount and oil collection system integration enables such gear systems while reducing overall part count and simplifying assembly. Moreover, the disclosed integration of the ring mount and oil collection system enables a lighter weight and less expensive gear system to be produced for high thrust geared turbofan engines.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A geared turbofan engine comprising:
a fan rotatable about an engine axis;
a compressor section compressing air and delivering the compressed air to a combustor where the compressed air is mixed with fuel and ignited to drive a turbine section that in turn drives the fan and the compressor section;
a gear system driven by the turbine section for driving the fan at a speed different than the turbine section, the gear system including:
a carrier attached to a fan shaft;
a plurality of planet gears supported within the carrier, wherein each of the plurality of planet gears includes a first row of gear teeth and a second row of gear teeth supported within the carrier;
a sun gear driven by the turbine section, the sun gear in driving engagement with the plurality of planet gears; and
at least two separate ring gears circumscribing the plurality of planet gears, wherein each of the at least two separate ring gears are supported by a separate flexible ring gear mount from a plurality of flexible ring gear mounts each separately attached to an engine static structure that enables movement of the at least two separate ring gears relative to the engine static structure, and wherein one of the plurality of flexible ring gear mounts includes a first axially curved section with respect to the engine axis that extends forward of the at least two separate ring gears with respect to the engine axis and another of the plurality of flexible ring gear mounts includes a second axially curved section with respect to the engine axis that extends aft of the at least two separate ring gears with respect to the engine axis and each of the plurality of flexible ring gear mounts include an opening in communication with a gutter that directs captured oil to an oil collection system.

2. The geared turbofan engine as recited in claim 1, wherein the sun gear includes a first set of gear teeth that meshes with the first row of gear teeth, and a second set of gear teeth that meshes with the second row of gear teeth.

3. The geared turbofan engine as recited in claim 1, including a first bearing assembly forward of the gear system supporting a forward portion of the fan shaft and a second bearing assembly aft of the gear system.

4. The geared turbofan engine as recited in claim 1, wherein the carrier and the fan shaft comprise an integral structure.

5. The geared turbofan engine as recited in claim 1, wherein the compressor section includes a low pressure compressor driven by the fan shaft at a speed common to the fan.

6. The geared turbofan engine as recited in claim 1, wherein oil is transported by one or more tubes to the oil collection system.

7. The geared turbofan engine as recited in claim 1, wherein each of the plurality of flexible ring gear mounts has equal stiffness to accommodate earner torsional wind up and reduce misalignment within the gear system.

8. The geared turbofan engine as recited in claim 7, wherein the plurality of flexible ring gear mounts enable the at least two separate ring gears to flex in a radial direction and an angular direction with respect to an engine centerline and are five (5) to ten (10) times stiffer in a torsional direction with respect to the engine centerline as compared to a stiffness in one of the radial direction and the angular direction.

9. The geared turbofan engine as recited in claim 1, wherein each of the plurality of planet gears is supported by one of a ball bearing, a roller bearing, a tapered roller bearing and a journal bearing.

10. A fan drive gear system for a gas turbine engine, the fan drive gear system comprising:
a carrier supporting a plurality of planet gears, wherein each of the plurality of planet gears includes a first row of gear teeth and a second row of gear teeth supported within the carrier;
a sun gear driven by a turbine section, the sun gear in driving engagement with the plurality of planet gears; and at least two independent sets of ring gear teeth circumscribing the plurality of planet gears, each of the at least two independent sets of ring gear teeth are engaged with a corresponding one of the first row of gear teeth and the second row of gear teeth, wherein each of the at least two independent sets of ring gear teeth are supported by a respective flexible ring gear mount from a plurality of flexible ring gear mounts, that enables movement relative to an engine static structure, wherein one of the plurality of flexible ring gear mounts includes a first axially curved portion with respect to an engine centerline forward of the at least two independent sets of ring gear teeth with respect to the engine centerline, and another of the plurality of flexible ring gear mounts includes a second axially curved portion with respect to the engine centerline aft of the at least two independent sets of ring gear teeth with respect to the engine centerline, and each of the plurality of flexible ring gear mounts include an opening in communication with a gutter that directs captured oil to an oil collection system.

11. The fan drive gear system as recited in claim 10, wherein the sun gear includes a first set of gear teeth that meshes with the first row of gear teeth, and a second set of gear teeth that meshes with the second row of gear teeth.

12. The fan drive gear system as recited in claim 10, including a first bearing assembly forward of the fan drive gear system supporting a forward portion of a fan shaft and a second bearing assembly aft of the fan drive gear system.

13. The fan drive gear system as recited in claim 12, wherein the carrier and the fan shaft comprise an integral structure.

14. The fan drive gear system as recited in claim 10, wherein the plurality of flexible ring gear mounts enable the at least two independent sets of ring gear teeth to flex in a radial direction and an angular direction with respect to the engine centerline and are five (5) to ten (10) times stiffer in a torsional direction with respect to the engine centerline compared to a stiffness in one of the radial direction and the angular direction.

\* \* \* \* \*